US009720979B2

(12) United States Patent
Dhara et al.

(10) Patent No.: US 9,720,979 B2
(45) Date of Patent: Aug. 1, 2017

(54) METHOD AND SYSTEM OF IDENTIFYING RELEVANT CONTENT SNIPPETS THAT INCLUDE ADDITIONAL INFORMATION

(71) Applicants: Krishna Kishore Dhara, Hyderabad (IN); Anil Jwalanna, Cupertino, CA (US)

(72) Inventors: Krishna Kishore Dhara, Hyderabad (IN); Anil Jwalanna, Cupertino, CA (US)

( * ) Notice: Subject to any disclaimer, the term of this patent is extended or adjusted under 35 U.S.C. 154(b) by 467 days.

(21) Appl. No.: 14/504,420

(22) Filed: Oct. 2, 2014

(65) Prior Publication Data

US 2015/0120720 A1 Apr. 30, 2015

Related U.S. Application Data

(63) Continuation-in-part of application No. 13/915,327, filed on Jun. 11, 2013, now Pat. No. 9,614,933.

(60) Provisional application No. 61/663,169, filed on Jun. 22, 2012, provisional application No. 61/773,083, filed on Mar. 5, 2013.

(51) Int. Cl.
*G06F 17/30* (2006.01)
*H04L 29/08* (2006.01)

(52) U.S. Cl.
CPC ...... *G06F 17/3053* (2013.01); *H04L 67/1002* (2013.01)

(58) Field of Classification Search
CPC ........................ G06F 17/3053; H04L 67/1095

USPC .......... 709/203; 705/7.11, 7.33, 7.38, 14.58; 707/728, 723, 742
See application file for complete search history.

(56) References Cited

U.S. PATENT DOCUMENTS

| 9,378,432 B2 * | 6/2016 | Shukla | G06K 9/00684 |
| 2013/0018896 A1 * | 1/2013 | Fleischman | G06Q 50/01 |
| | | | 707/748 |

OTHER PUBLICATIONS

"Analysis of User Keyword Similarity in Online Social Networks"—Garg et al, Department of Computer Science, University of California, Davis, Jun. 2010 http://prantik.github.io/docs/snam11.pdf.*

* cited by examiner

*Primary Examiner* — Randy Scott

(57) ABSTRACT

In one exemplary aspect, a method includes the step of obtaining a content of a content block. The content is represented as a content vector. A query is received. The query is represented as a query vector. A hierarchical sliding similarity and dissimilarity is determined for matching the content vector and the query vector, this step can include the steps of: determining a similarity measure and a dissimilarity measure for each content vector element with respect to the query vector; identifying a strong match over a sliding window of sub-terms of each content vector element; computing a sub-similarity score and a sub-dissimilarity score for each level of the convent vector element; determining a final similarity score as a combination of the strong match of some sub-vectors at different levels; and determining a final dissimilarity score as a combination of the strong match of some sub-vectors at different levels.

18 Claims, 8 Drawing Sheets

METHOD AND SYSTEM OF IDENTIFYING RELEVANT CONTENT SNIPPETS THAT INCLUDE ADDITIONAL INFORMATION

CROSS-REFERENCE TO RELATED APPLICATIONS

This application hereby incorporates by reference the following applications in their entirety: U.S. Provisional Patent Application No. 61/663,169, titled Cloud Based Content Management and filed on 22 Jun. 2012; and U.S. patent application Ser. No. 13/915,327, titled Method And System Of Cloud-computing Based Content Management And Collaboration Platform With Content Blocks, and filed on 26 Jun. 2013.

FIELD OF THE INVENTION

The invention is in the field of information retrieval and more specifically to a method, system and apparatus of identifying relevant content snippets that include additional information.

DESCRIPTION OF THE RELATED ART

Current solutions and prior art in the information retrieval largely focuses on finding similar or near-similar documents or content blocks. These are primarily used for search to find similar documents, filter search results to eliminate document with duplicate content blocks, to find plagiarism in documents, to determine query specific content in documents, and other such related use cases. All these solutions focus on finding similarity/near similarity of documents or content blocks within documents.

Prior art in this field can be categorized into many dimensions as follows. One dimension is to come up with feature vectors that represent the content block and check for similarity, such as cosine similarity, etc. These feature vectors can include reverse-index techniques, keyword extraction techniques, advanced NLP techniques that understand both lexical as well as semantic aspects of the language, and contextual information of the content block or the user. The aim is to find a feature vector that better models the similarity of content blocks that is expected by users. Another dimension is to use standard feature vectors or enhanced feature vectors on varied content blocks such as "shingles" technique. The aim of these solutions is to find parts of contents that are similar to a specific query or to a content block. They use techniques such as min-hash and locality sensitive hashing. Another dimension is to use advanced topic modelling techniques and ML techniques to reduce the search space of documents and use the above techniques for similarity. Yet another dimension is to increase the efficiency of the vector representation to speed up similarity especially for content other than text. Techniques such as sketches and fingerprinting fall under this category. In view of this, improvements may be made over conventional methods but the focus of these techniques is to find lexically or semantically similar content blocks in an efficient way.

BRIEF SUMMARY OF THE INVENTION

In one aspect, a method includes the step of obtaining a content of a content block. The content is represented as a content vector. A query is received. The query is represented as a query vector. A hierarchical sliding similarity and dissimilarity is determined for matching the content vector and the query vector, and wherein determining a hierarchical sliding similarity for matching the content vector and the query vector comprises the steps of: determining a similarity measure and a dissimilarity measure for each content vector element with respect to the query vector, wherein each content vector element is provided a unique sub-similarity similarity measure and a unique sub-dissimilarity measure; for each unique sub-similarity similarity measure and each unique sub-dissimilarity measure of each content vector element, identifying a strong match over a sliding window of sub-terms of each content vector element, wherein the strong match comprises a strong similarity match and a strong dissimilarity match; computing a sub-similarity score and a sub-dissimilarity score for each level of the convent vector element; determining a final similarity score as a combination of the strong match of some sub-vectors at different levels; and determining a final dissimilarity score as a combination of the strong match of some sub-vectors at different levels.

Optionally, at least one content block can be returned based on a combination of the final similarity score and the final dissimilarity score. A content block can include a structured digital information or an unstructured digital information, and wherein the content block comprises a set of text, a digital image, a video file or an audio file. The vector format of the content can include one or more feature vectors representing sub-terms of the content block.

Figure 1:
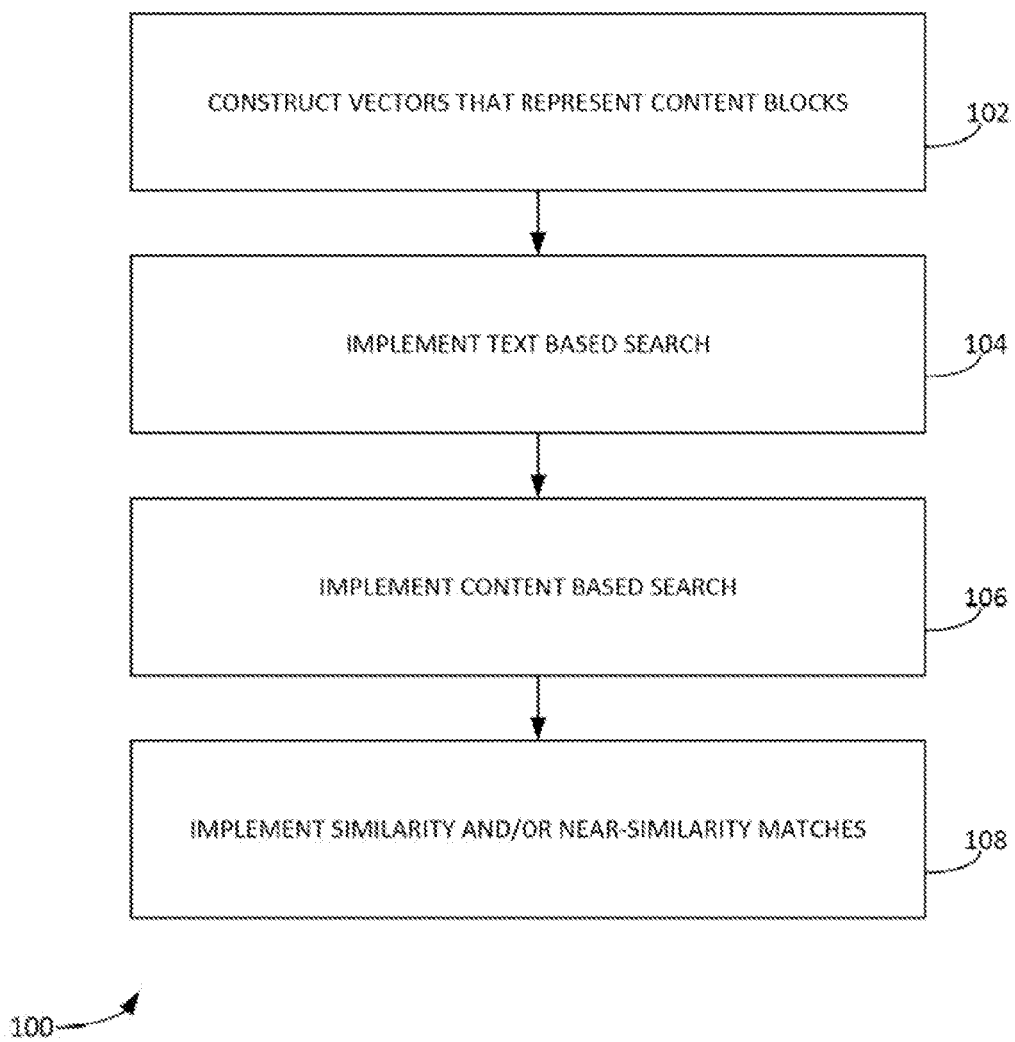
FIG. 1 depicts an example process of indexing content blocks, according to some embodiments.

The Figures described above are a representative set, and are not an exhaustive with respect to embodying the invention.

DESCRIPTION

Disclosed are a system, method, and article of manufacture of identifying relevant content snippets that include additional information and/or related dissimilar information. The following description is presented to enable a person of ordinary skill in the art to make and use the various embodiments. Descriptions of specific devices, techniques, and applications are provided only as examples. Various modifications to the examples described herein can be readily apparent to those of ordinary skill in the art, and the general principles defined herein may be applied to other examples and applications without departing from the spirit and scope of the various embodiments.

Reference throughout this specification to "one embodiment," "an embodiment," 'one example,' or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art can recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, and they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

DEFINITIONS

Content blocks can be structured or unstructured digital information of any size that includes text, pictures, video, audio, and other modalities. As an example, a document can be a content block or a section of a document with its structure and any multi-media information that is present.

Feature vector can be an n-dimensional vector of numerical features that represent some object.

Hierarchical feature vector can be an n-dimensional vector where each element is itself a feature vector representing a certain aspect of the object.

Jaccard index (e.g. Jaccard similarity coefficient) can be a statistic used for comparing the similarity and diversity of sample sets. The Jaccard coefficient measures similarity between finite sample sets, and is defined as the size of the intersection divided by the size of the union of the sample sets:

$$J(A,B) = {{|A \cap B|} \over {|A \cup B|}}.$$

Search engine can include an information retrieval system designed to help find information stored on a computer system Strong similarity measure can be similarity measures above a specified value. A similarity measure (and/or similarity function) can be a real-valued function that quantities the similarity between two objects. Although no single definition of a similarity measure exists, usually similarity measures are in some sense the inverse of distance metrics: they take on large values for similar objects and either zero or a negative value for very dissimilar objects. In some examples, a cosine similarity can used as a similarity measure.

Strong dissimilarity measure can be a dissimilarity measure above a specified value (e.g. a metric that produces a higher value as corresponding values in two compared vectors X and Y become less dependent and/or less alike).

Text-based search can include techniques for searching a single computer-stored document or a collection in a full text database. Text-based search can include a full-text search and/or searches based on metadata (e.g. titles, abstracts, selected sections, or bibliographical references, etc.) and/or on parts of the original texts represented in databases. For example, a search engine can examine all of the words in every stored document as it tries to match search criteria (e.g. text specified by a user).

Example Methods

Consider a query or a portion of content directed to a sales or a marketing employee. They would like to answer the query with material that may be similar to what the query is asking but the answer to the query might be completely dissimilar. That is, if the retrieval is returning portions of text or content that is similar to the query then it is not useful to the sales or marketing employee. The ideal result would be a portion of text that is similar and yet has high degree of dissimilarity, which indicates that the returned nugget of content has some new insight or new material.

Similarly, consider the case of a user browsing enterprise social media, such as Salesforce Chatter, and is trying to respond to a feed posted by other employees. Typically, users search their repositories to find content that could be useful to the discussion.

For example, consider a discussion about a sale to a customer. A user can add value to the discussion by posting a nugget of content that highlights similar such sales or product information and about the differentiators that the client is looking for. In such cases, if the user searches for text from the discussion or if an application is recommending content that is similar to the one that is posted then there may not be much to add to the discussion. Instead if the user looks for nuggets of content that are somewhat similar but are quite dissimilar in other aspects, then they have a chance of posting content that actually adds more information to the discussion.

It is noted that, in some embodiments, both similarity and dissimilarity at different levels can be utilized. For example, a user can search similarity of one aspect (e.g. a keyword), but dissimilarity in another aspect (e.g. participants). In another example, a user can search for similarity in pictures (e.g. a digital image) but dissimilarity in keywords. These examples are provided by way of example and not of limitation. Other examples of a search that uses similarity on one aspect and dissimilarity in another can be utilized.

While browsing a competitor or an analysis site, a user might want to highlight a nugget of content and use that to see if their solution has any differentiator. This is especially useful for enterprise sales in discussions with customers about their competitors. In such cases, again the retrieval can return contents that have the property of strong similarity as well as strong dissimilarity.

In each of these sample use cases, the strong similarity ensures that the retrieved information is related to what users are looking and more importantly the strong dissimilarity ensures the retrieved information actually contains more information.

The problem solved by the proposed invention is the following. Based on the current discussion or content presented, a user can find out content blocks in their personal or other repositories that are related in parts and add more information to the discussion or content presented.

A specified similarity mechanism and/or dissimilarity mechanism can be used to retrieve content (e.g. text, dynamic content, etc.). The content can be used for adding value to a discussion and/or providing content blocks (e.g. dynamic content blocks) with additional information. Instead of indexing and comparing documents for similarity, an exemplary hierarchical sliding technique can be implemented. The hierarchical sliding technique can enable similarity checking for specified terms or specific parts, and portions of content blocks that are not similar. After narrowing down the specified similarity terms, a similar technique can also be used for dissimilarity checking and/or ranking the retrieved content blocks. Strong similarity can provide retrieved information that is related to what a user is seeking. Similarity can be a numerical measure of how alike two data objects are and the value of said similarity measure can be higher when the data objects are more alike. Additionally, strong dissimilarity can provided retrieved information that includes additional information (e.g. beyond that located by strong similarity alone). Dissimilarity can be a numerical measure of how different two data objects are and lower when objects are more alike. Accordingly, a user can retrieve content blocks from various data stores, such as, inter alia, his/her personal or work repositories. Content blocks can be related in parts and add more information to the discussion or content presented. For example, a query on some product or a product discussion on a social network can be used as a query vector and matched against a set of users or an enterprise corpus. Unlike standard techniques, this type of matching can give importance to the closeness of certain parts of the content blocks, as well as, how distant the query vector is to the indexed information.

FIG. 1 depicts an example process 100 of indexing content blocks, according to some embodiments. In particular, process 100 can be utilized for indexing content blocks in order to identify relevant content snippets that include additional information. In step 102 of process 100, vectors are constructed that represent content blocks. Vectors can include such information as, inter alia: keywords, fingerprints, shingles, tiles, images, and/or other relevant information regarding a specified document/file. Relevant content blocks can then be found in two dimensions. For example, in step 104, a text-based search can be implement as one dimension of a search process to retrieve relevant content blocks. In step 106, a content-based search can be implement. In both the steps 104 and 106, the relevant content blocks are not just the ones that are similar to query vector but ones that match partially also. In similarity searches these may not be considered as the score or level of similarity could be low and below a threshold. To realize this for content based searches, one can look for partial similarity of an image or a partial audio file to find a match and return results that have additional information based on this (as we further explain in the steps below). Step 104 and 106 can include a first dimension of the sub-process of finding partially relevant content blocks.

A second dimension of the sub-process of finding relevant content blocks is provided in step 108. In step 108 of process 100, similarity and/or near-similarity matches can be performed. Hence, the vector constructed by process 100 depends on the kind of search and on the use case for a similarity match. Vectors created by process 100 can be a content vector (e.g. utilizing vector space model or term vector model). The content vectors capture various features of content. Examples could be keywords, images, author, date, timeline, access profile, etc. Traditional similarity mechanisms would result in low scores if only a few of these features of the content vectors match. The partial similarity or near similarity we are seeking as a first dimension would require a match of few components but that match has to be stronger. This partial similarity would allow the retrieval of content vectors that are dissimilar or have additional information. The content vector can be used to index one or more content blocks.

Figure 2:
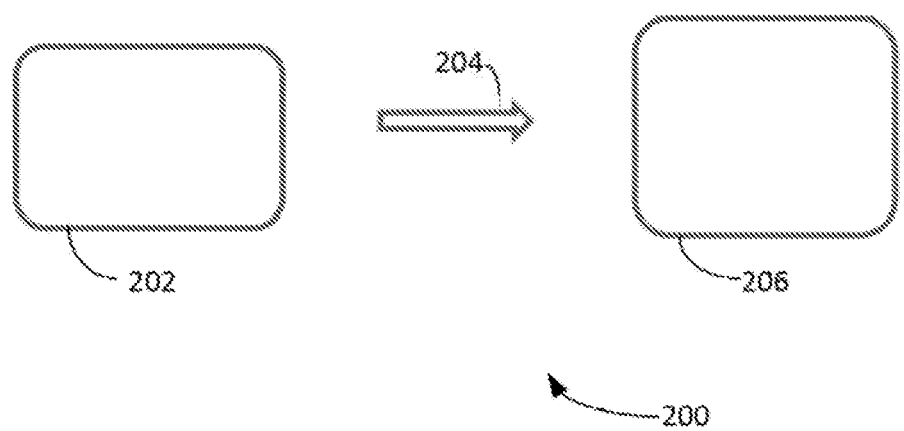
FIG. 2 illustrates, in block diagram format, another process of indexing content blocks, according to some embodiments.

FIG. 2 illustrates, in block diagram format, another process 200 of indexing content blocks, according to some embodiments. Repository 202 can include one or more content blocks $C_1$-$C_k$. Element 204 represents a process (e.g. process 100 of FIG. 1, etc.) whereby content blocks $C_1$-$C_k$ are converted to content vectors 206. Each content block can include $<t^k_1, t^k_2, \ldots, t^k_n>$ vector representations of the n terms of said content block as shown. Here each $t^k_i$ in turn is a vector that represents a certain feature of the content block. For example, it could be a vector of keywords with weights in the document or represent portions of an image with its characteristics. Here again, standard similarity mechanisms look for a high score for the two ith vectors $t^k_i$ and $t^j_i$ of content blocks k and j. For a partial similarity looking for additional information, a low overall score but a strong sub-vector or partial score of similarity between $t^k_i$ and $t^j_i$ is sufficient.

Figure 3:
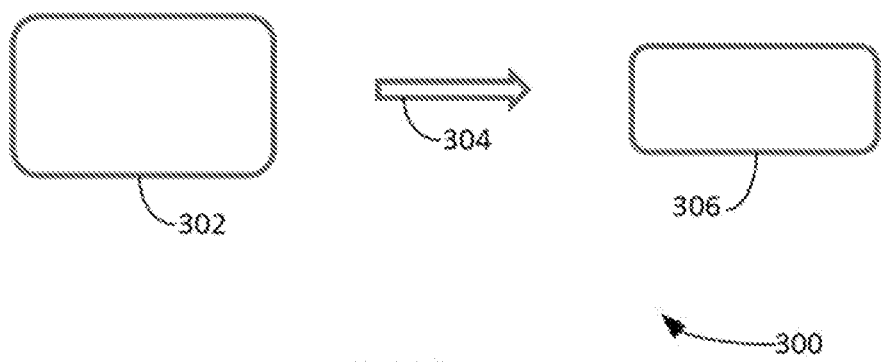
FIG. 3 depicts an example process for generating a query vector, according to some embodiments.

FIG. 3 depicts an example process 300 for generating a query vector, according to some embodiments. Query vectors can be utilized for relevance matching processes. The construction of query vectors can follows a similar approach as the indexing of the content blocks. The query vector is constructed in a similar way as the content vectors with images, author, date, timeline, access profile, etc. The queries may be in various forms, such as, inter alia: search words, highlighted paragraph(s), or a discussion or feeds to a social wall. Accordingly, the content of these sources can be utilized as the content text 302 to construct said query vectors for a user indicate query 'Q' (e.g. user inputs search words, highlights text, etc.). The construction of query vector 'Q' depends on how content blocks are constructed and may include contextual information. Examples of contextual information could be the set of people that can access a feed on a social wall, timeline, etc. Note that these could be valuable for both partial similarity and for dissimilarity if the content blocks contain such indices. Element 304 represents at least one process used to convert the content text to one or more query vectors 306. Query vectors 306 can include $<q_1, q_2, q_n>$ vector representations of the n terms of query vectors 306 as shown.

Figure 4:
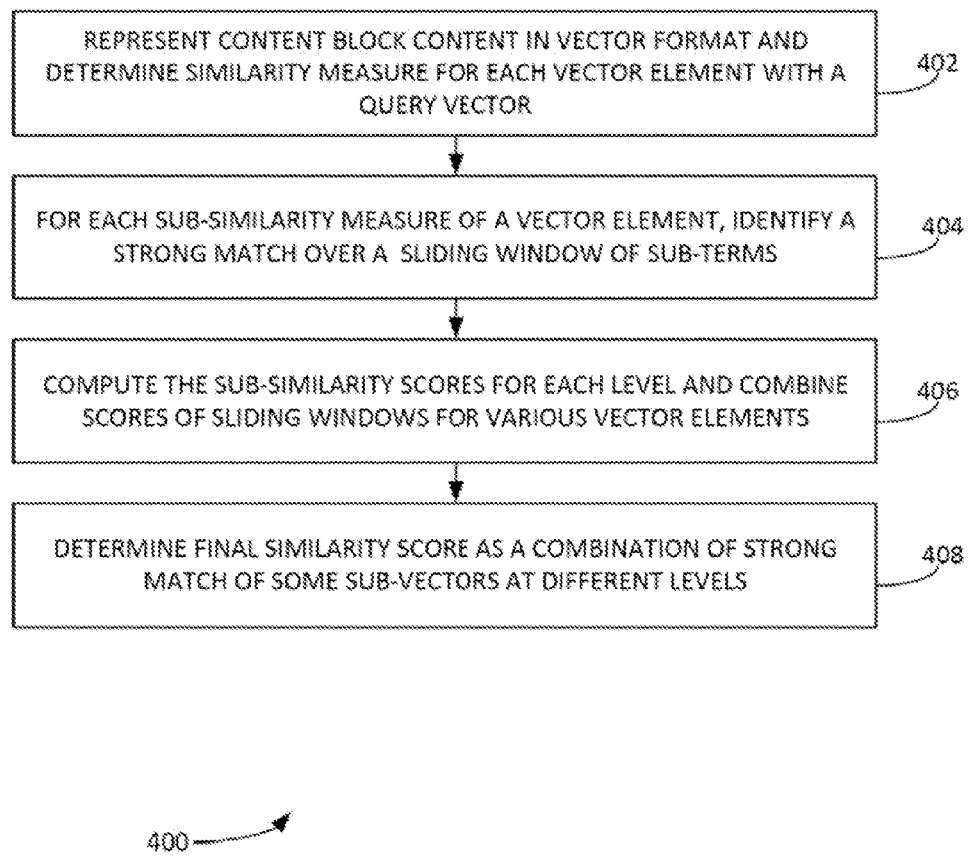
FIG. 4 illustrates an example process of identifying relevant content blocks, according to some embodiments.

FIG. 4 illustrates an example process 400 of identifying relevant content blocks, according to some embodiments. More specifically, process 400 illustrates a method of determining a hierarchical sliding similarity for finding relevant content blocks and/or snippets within content blocks. Hierarchical sliding similarity allows determining partial similarity from two aspects when compared with traditional similarity searches that slide over vectors. The first one is to look for only partial strong matches and not a cumulative match of all the sliding windows. The second one, which could be utilized for multi-modal content blocks and for the use case examples discussed herein, is its ability to find partial similarity matches across various feature vectors such as keyword vectors, image vectors, audio signal vectors, etc.

Hierarchal sliding similarity does not look for a similarity or near-similarity based on the entire vector. In step 402 of process 400, a content block content can be represented in vector format and a similarity measure can be determined for each vector element with a query vector. For example, let $<t^i_1, t^i_2, t^i_n>$ represent the 'n' terms of a content block '1'. Accordingly, each term $t^i_j$ may have a unique similarity measure. If the term vector $t^i_1$ represents key words, it may have a similarity measure such as cosine similarity and if the term vector $t^i_1$ represents an image then the similarity measure can be a different similarity measure such as a color distribution and a shape similarity.

In step 404, for each sub-similarity measure of a vector element, a strong match over a sliding window of sub-terms can be identified. For example, each of these sub-similarity measures for $t^i_j$ can be further modified to identify a strong match over a sliding window of sub-terms. For example, if each of the $t^i_j$ is of the form $<t^i_{j1}, t^i_{j2} \ldots t^i_{jn}>$ then the sliding window of sub-terms can provide the score of the strongest match. For example, a cosine and/or a Jaccard similarity between two vectors can be different when one only considers a subset of the terms. To see how the sliding window can be applied, consider two sub-vectors of keywords. A sliding window can be applied to compute the similarity of the matching keywords along with their weights. A highest score can be determined as the result of the sub-similarity matching. A threshold can be used to ensure that the strong match of some sub-components occur.

In step 406, the sub-similarity scores for each level can be computed. The scores of sliding windows for various $t^i_j$'s can be combined (e.g. using a similar technique as supra (e.g. with any applicable weights) to combine).

In step 408, final similarity score can be determined as a combination of strong match of some sub-vectors at different levels. For example, the final similarity score is a combination of strong match of some sub-vectors at different levels. This can provide a notion of similar documents (e.g. to the query) that have a strong match in only certain terms and strong dissimilarity in other terms.

Figure 5:
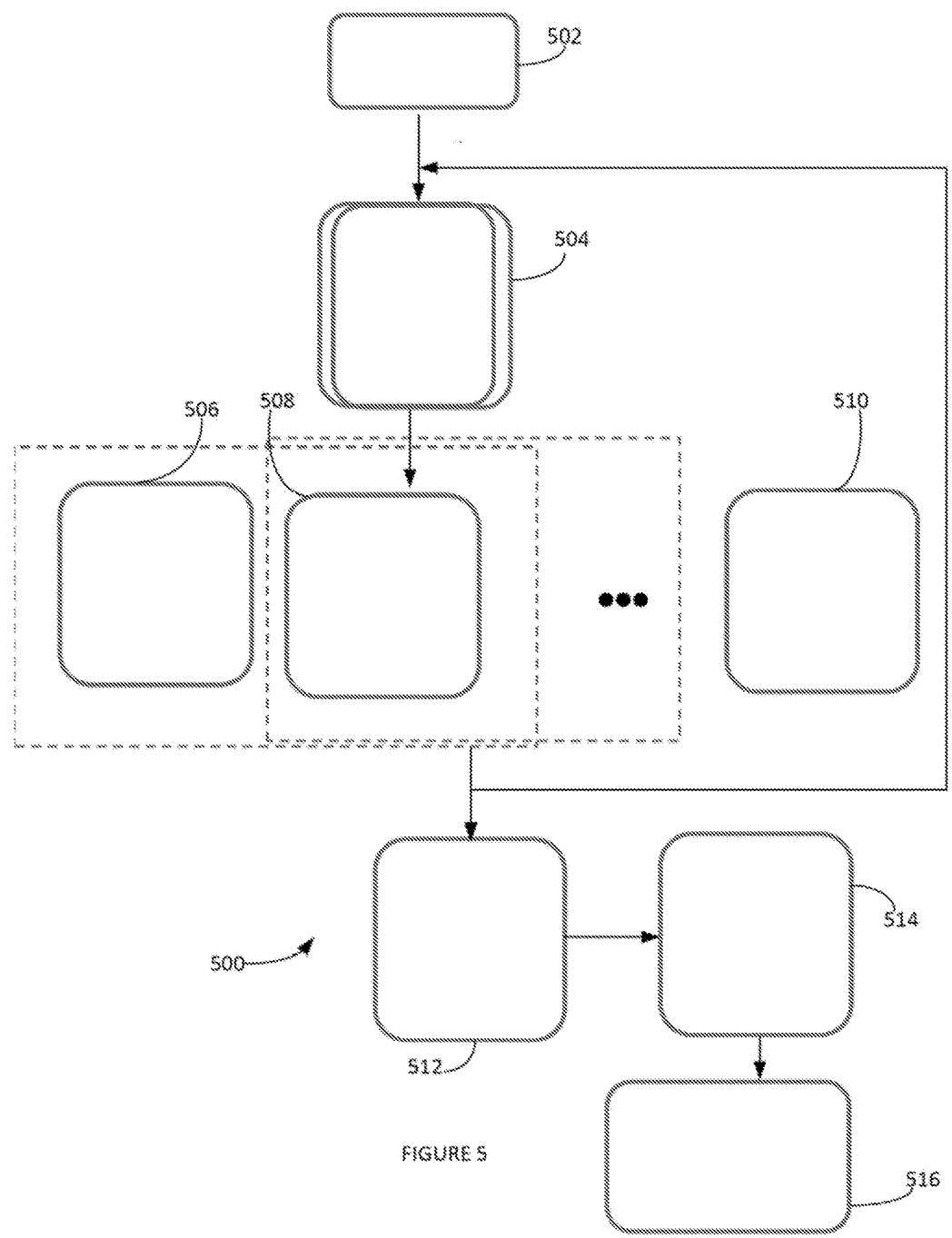
FIG. 5 illustrates an example another process of identifying relevant content blocks, according to some embodiments.

FIG. 5 illustrates an example another process 500 of identifying relevant content blocks, according to some embodiments. In step 502, a query 'Q' can be matched with one or more content blocks '$C_i$'. In step 504, a vectorized 'Q' (e.g. as $<q_1, \ldots, q_n>$) can be matched with vectorized content blocks (e.g. as $<t_{j1}, \ldots, t_{jn}>$). In steps 506-510, sliding match scores can be determined (e.g. as shown). In step 512, the $C_i$s that have a window with score greater than a threshold can be selected. In step 514, the dissimilarity can be computed in a similar way with hierarchical sliding windows. However, this dissimilarity in both the levels of the hierarchy can be computed not just as a compliment of the partial similarity but by using the weighted contextual information from the query. For example, if the query vector has a certain domain specific words for similarity and the contextual information says the discussion is among peers then content block authored by a supervisor, which is dissimilar, could have a higher value. Another distinction is that the dissimilarity could be a factor of the similarity. For example, if the partial similarity is on the people who shared a content block, then the weightage for retrieving relevant content with additional information could be different than if the partial similarity is on keyword vector. In step 516, $C_i$s can be ranked using weighted hierarchical sliding score and/or dissimilarity scores.

Figure 6:
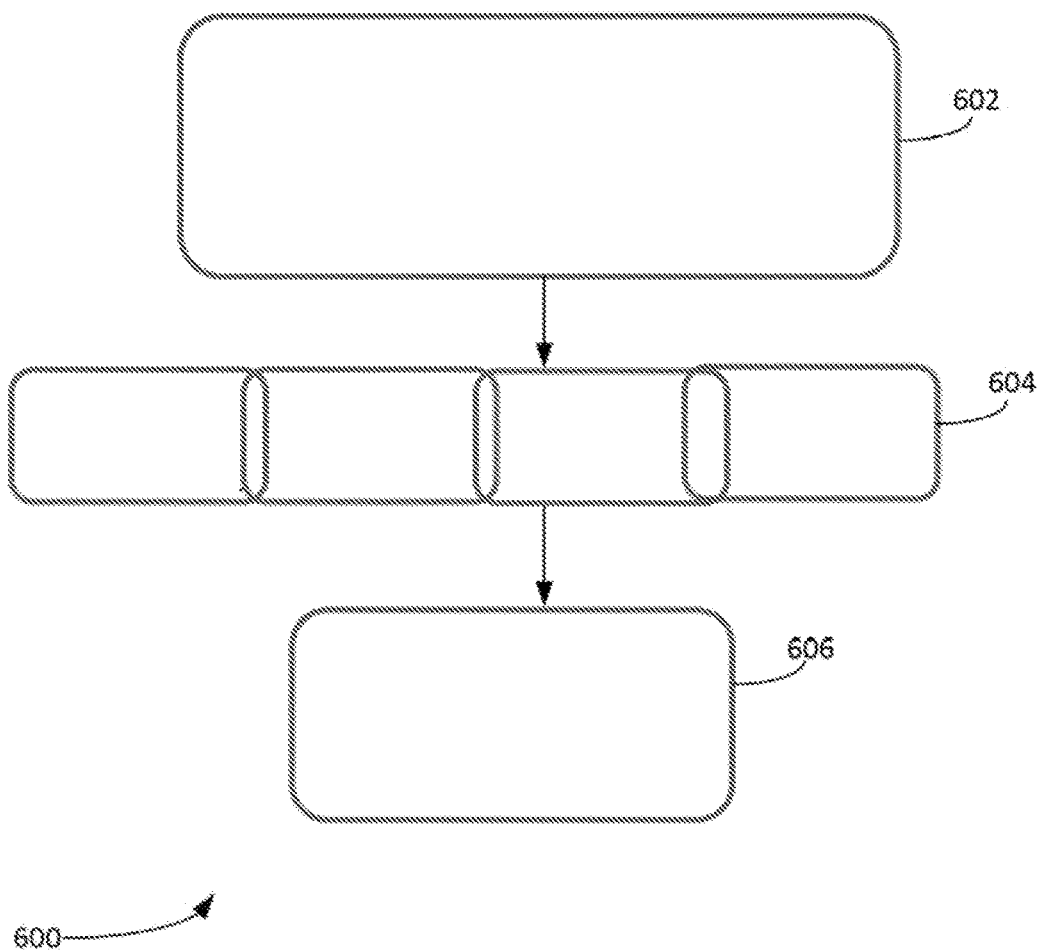
FIG. 6 depicts a process of ranking documents, according to some embodiments.

FIG. 6 depicts a process 600 of ranking documents (e.g. document obtained from process 500), according to some embodiments. From the set of documents returned from process 500, ranking can be performed using dissimilarity functions. The dissimilarity can be computed as a complement of similarity and/or may be defined based on the use case (e.g. a farthest distance, least common terms, etc.). Accordingly, in step 602 of process 600, a query vector and the content block vector are provided. In step 604, sliding match score is obtained for the query vector and the content block vector with similarity function. The variable 'w' represents a window size value. The granularity of the window size depends on the similarity mechanism and criteria that it represents, in step 606, the highest score based on a specified criteria 'cr' is selected. If the highest score is above a specified threshold, then return the highest score is returned.

It is noted that certain domain specific keywords can be used for similarity and enterprise/domain specific words for dissimilarity matching. Participants matching along with their role in enterprises (or influence score) can be utilized. While matching participants (influential or not) is useful for similarity, dissimilarity or additional content generated by influential participants could be of more value. One aspect of hierarchical matching would be to ensure that the similarity or dissimilarity could have a structural correlation criteria. That is, the criteria could be a similarity (or dissimilarity) matching threshold of a keyword vector followed by image matching vector or shared participants vector. Such a criteria could ensure that certain keywords should be followed by other medium such as images, voice, etc. or certain (e.g. similar or dissimilar) content vector is shared among (e.g. similar or dissimilar) participants. This can ensure that a) new content can be shared to a different set of people, b) old content can be shared with a new set of people, c) new content could be shared with old set of people etc., depending on the criteria.

Example Systems and Computer Architectures

Figure 7:
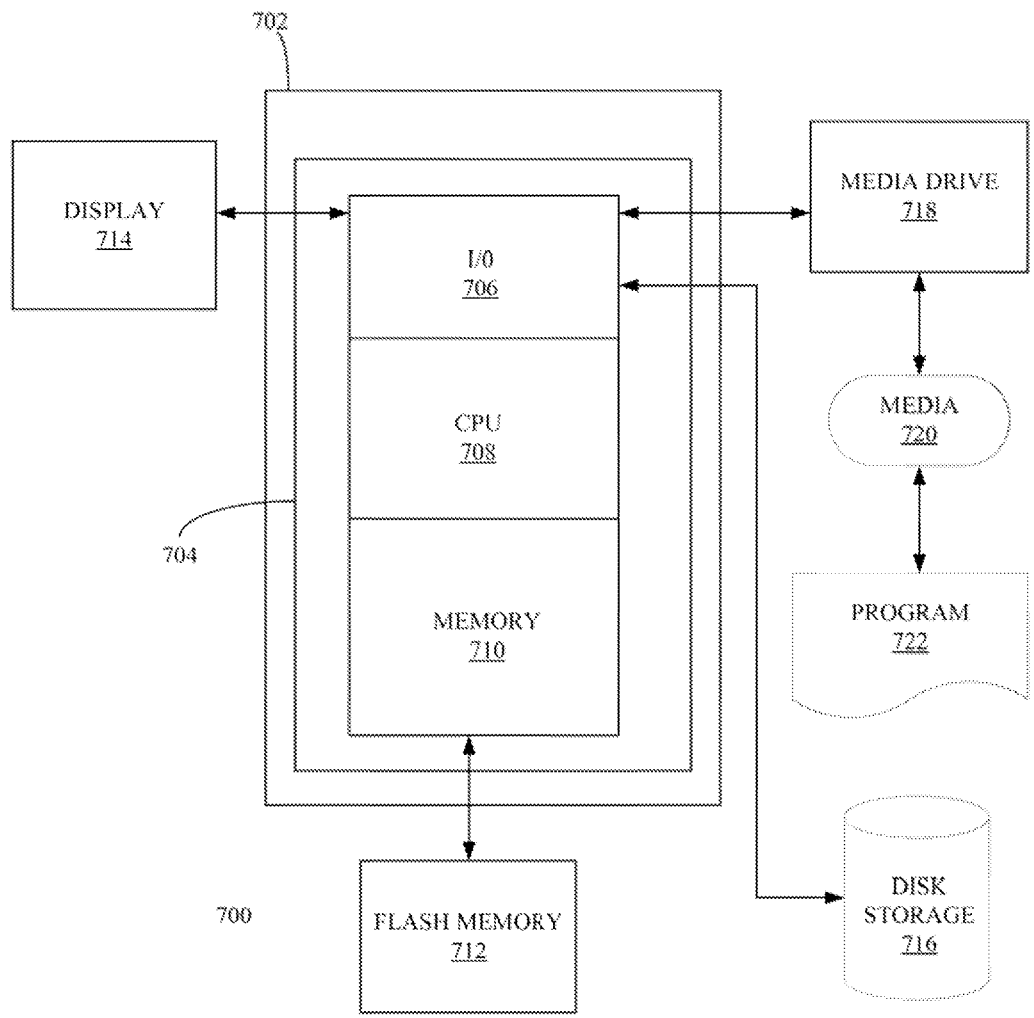
FIG. 7 is a block diagram of a sample computing environment that can be utilized to implement some embodiments.

FIG. 7 depicts an exemplary computing system 700 that can be configured to perform any one of the processes provided herein. In this context, computing system 700 may include, for example, a processor, memory, storage, and I/O devices (e.g., monitor, keyboard, disk drive, Internet connection, etc.). However, computing system 700 may include circuitry or other specialized hardware for carrying out some or all aspects of the processes. In some operational settings, computing system 700 may be configured as a system that includes one or more units, each of which is configured to carry out some aspects of the processes either in software, hardware, or some combination thereof.

FIG. 7 depicts computing system 700 with a number of components that may be used to perform any of the processes described herein. The main system 702 includes a motherboard 704 having an I/O section 706, one or more central processing units (CPU) 708, and a memory section 710, which may have a flash memory card 712 related to it. The I/O section 706 can be connected to a display 714, a keyboard and/or other user input (not shown), a disk storage unit 716, and a media drive unit 718. The media drive unit 718 can read/write a computer-readable medium 720, which can include programs 722 and/or data. Computing system 700 can include a web browser. Moreover, it is noted that computing system 700 can be configured to include additional systems in order to fulfill various functionalities. Computing system 700 can communicate with other computing devices based on various computer communication protocols such a Wi-Fi, Bluetooth® (and/or other standards for exchanging data over short distances includes those using short-wavelength radio transmissions). USB, Ethernet, cellular, an ultrasonic local area communication protocol, etc.

Figure 8:
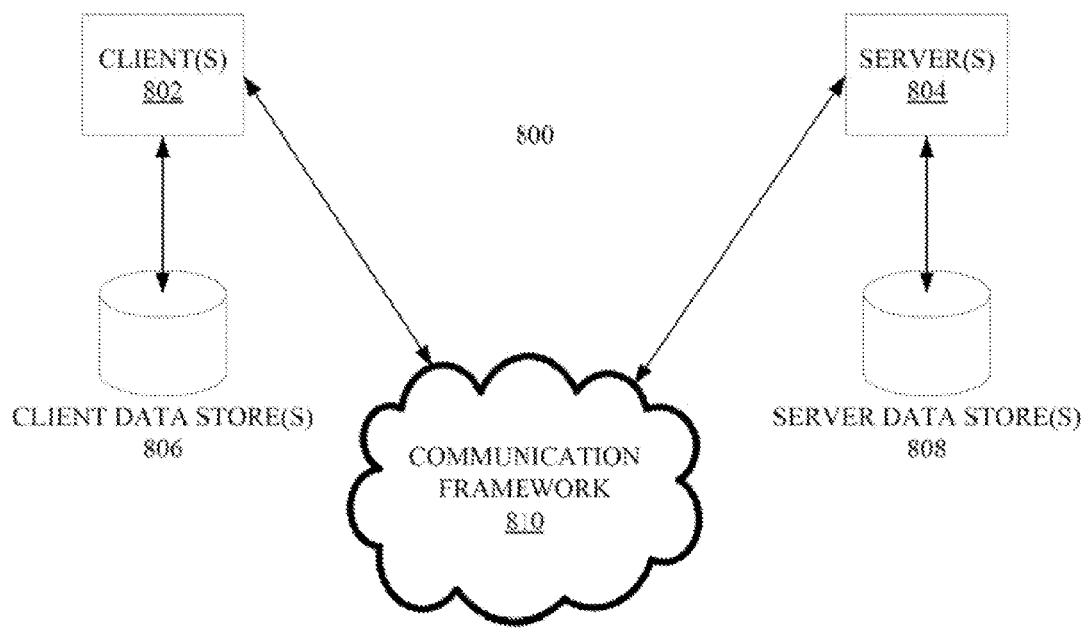
FIG. 8 is a block diagram of a sample computing environment 800 that can be utilized to implement some embodiments.

FIG. 8 is a block diagram of a sample computing environment 800 that can be utilized to implement some embodiments. The system 800 further illustrates a system that includes one or more client(s) 802. The client(s) 802 can be hardware and/or software (e.g., threads, processes, computing devices). The system 800 also includes one or more server(s) 804. The server(s) 804 can also be hardware and/or software (e.g., threads, processes, computing devices). One possible communication between a client 802 and a server 804 may be in the form of a data packet adapted to be transmitted between two or more computer processes. The system 800 includes a communication framework 810 that can be employed to facilitate communications between the client(s) 802 and the server(s) 804. The client(s) 802 are connected to one or more client data store(s) 806 that can be employed to store information local to the client(s) 802. Similarly, the server(s) 804 are connected to one or more server data store(s) 808 that can be employed to store information local to the server(s) 804.

In some embodiments, system 800 can be include and/or be utilized by the various systems and/or methods described herein to implement any of the process and/or examples provided supra. Client 802 can be in an application (such as a web browser, augmented reality application, text messaging application, email application, instant messaging application, etc.) operating on a computer such as a personal computer, laptop computer, mobile device (e.g. a smart phone) and/or a tablet computer. In some embodiments, computing environment 800 can be implemented with the server(s) 804 and/or data store(s) 808 implemented in a cloud computing environment.

CONCLUSION

Although the present embodiments have been described with reference to specific example embodiments, various modifications and changes can be made to these embodiments without departing from the broader spirit and scope of the various embodiments. For example, the various devices, modules, etc. described herein can be enabled and operated using hardware circuitry, firmware, software or any combination of hardware, firmware, and software (e.g. embodied in a machine-readable medium).

In addition, it can be appreciated that the various operations, processes, and methods disclosed herein can be embodied in a machine-readable medium and/or a machine accessible medium compatible with a data processing system (e.g. a computer system), and can be performed in any order (e.g. including using means for achieving the various operations). Accordingly, the specification and drawings are to be regarded in an illustrative rather than a restrictive sense. In some embodiments, the machine-readable medium can be a non-transitory form of machine-readable medium.

What is claimed as new and desired to be protected by Letters Patent of the United States is:

1. A method of information retrieval comprising:
   obtaining a content of a content block;
   representing the content as a content vector;
   receiving a query;
   representing the query as a query vector;
   determining a hierarchical sliding similarity and dissimilarity for matching the content vector and the query vector, and wherein determining a hierarchical sliding similarity for matching the content vector and the query vector:
      determining a similarity measure and a dissimilarity measure for each content vector element with respect to the query vector, wherein each content vector element is provided a unique sub-similarity similarity measure and a unique sub-dissimilarity measure;
      for each unique sub-similarity similarity measure and each unique sub-dissimilarity measure of each content vector element, identifying a strong match over a sliding window of sub-terms of each content vector element, wherein the strong match comprises a strong similarity match and a strong dissimilarity match;
      computing a sub-similarity score and a sub-dissimilarity score for each level of the convent vector element;
      determining a final similarity score as a combination of the strong match of some sub-vectors at different levels; and
      determining a final dissimilarity score as a combination of the strong match of some sub-vectors at different levels.

2. The method of claim 1, further comprising:
   returning at least one content block based on a combination of the final similarity score and the final dissimilarity score.

3. The method of claim 1, wherein a content block comprises a structured digital information or an unstructured digital information, and wherein the content block comprises a set of text, a digital image, a video file or an audio file.

4. The method of claim 1, wherein the vector format of the content comprises one or more feature vectors representing sub-terms of the content block.

5. The method of claim 1, wherein the query vector comprises a vector model of a set of search words, a highlighted section of text or a microblog post.

6. The method of claim 1, wherein determining the hierarchal sliding similarity does not determine a similarity or near-similarity based on the entire content vector.

7. The method of claim 1, wherein the sub-terms of each content vector element comprise a sub-vector of the content vector.

8. The method of claim 1, wherein the dissimilarity measure is computed as a compliment of a partial similarity between the query vector and the content vector and using a weighted contextual information derived from the query.

9. A computerized system of information retrieval comprising:
   a hardware processor configured to execute instructions;
   a memory including instructions when executed on the processor, causes the processor to perform operations that:
   obtain a content of a content block;
   represent the content as a content vector; receive a query;
   represent the query as a query vector;
   determine a hierarchical sliding similarity and dissimilarity for matching the content vector and the query vector, and wherein determining a hierarchical sliding similarity for matching the content vector and the query vector:

determine a similarity measure for each content vector element with respect to the query vector, wherein each content vector element is provided a unique sub-similarity similarity measure;

for each unique sub-similarity similarity measure of each content vector element, identify a strong similarity match over a sliding window of sub-terms of each content vector element;

compute a sub-similarity score for each level of the convent vector element;

determine a final similarity score as a combination of the strong match of some sub-vectors at different levels;

determine a dissimilarity measure for each content vector element with respect to the query vector, wherein each content vector element is provided a unique sub-dissimilarity measure;

for each unique sub-dissimilarity measure of each content vector element, identify a strong dissimilarity match over a sliding window of sub-terms of each content vector element;

compute a sub-dissimilarity score for each level of the convent vector element; and determine a final dissimilarity score as a combination of the strong match, of some sub-vectors at different levels.

10. The computerized system of claim 9, wherein the memory further includes instructions when executed on the processor, causes the processor to perform operations that:

return at least one content block based on a combination of the final similarity score and the final dissimilarity score.

11. The computerized system of claim 10, wherein the returned at least one content block has a property of strong similarity with the query vector and a strong dissimilarity with the query vector.

12. The computerized system of claim 9, wherein a content block comprises a structured digital information or an unstructured digital information, and wherein the content block comprises a set of text, a digital image, a video file or an audio file.

13. The computerized system of claim 9, wherein the vector format of the content comprises one or more feature vectors representing sub-terms of the content block.

14. The computerized system of claim 9, wherein the query vector comprises a vector model of a set of search words, a highlighted section of text or a microblog post.

15. The computerized system of claim 9, wherein determining the hierarchal sliding similarity does not determine a similarity or near-similarity based on the entire content vector.

16. The computerized system of claim 9, wherein the sub-terms of each content vector element comprise a sub-vector of the content vector.

17. The computerized system of claim 9, wherein the similarity measure relates to a first aspect of the content vector element and the dissimilarity measure relates to a second content vector element.

18. The computerized system of claim 17, wherein the first content vector element comprises a digital image element and the second content vector element comprises a participant identifier element.

* * * * *